United States Patent [19]

Doyle

[11] Patent Number: 4,536,102
[45] Date of Patent: Aug. 20, 1985

[54] BAR OR ROD OR TUBE FRAME MULTI-POSITION ASSEMBLY CLAMP

[76] Inventor: Patrick Doyle, P.O. Box 1628, New Rochelle, N.Y. 10802

[21] Appl. No.: 476,754

[22] Filed: Mar. 18, 1983

[51] Int. Cl.³ .............................................. F16B 7/04
[52] U.S. Cl. ..................................... 403/390; 403/400
[58] Field of Search ............... 403/390, 391, 396, 400, 403/394

[56] References Cited

U.S. PATENT DOCUMENTS

| | | | |
|---|---|---|---|
| 1,040,620 | 10/1912 | Clark | 403/391 X |
| 3,425,028 | 1/1969 | Neaderland | 403/390 X |
| 4,311,407 | 1/1982 | Doyle | 403/390 |

Primary Examiner—Andrew V. Kundrat
Attorney, Agent, or Firm—Karl W. Flocks; Sheridan Neimark

[57] ABSTRACT

A bar or rod or tube clamp-type connector for assembling a frame to be covered by a woven fabric or tarpaulin or plastic film or sheet wherein the clamp-type connector comprises at least two rigid metal elements and one pierced resilient or cushioning element and wherein each rigid element includes a recessed portion having a limited inner friction surface which is grooved or knurled and a polygonally apertured flange having rounded corners extending therefrom and a carriage bolt having a polygonal locking portion and a cylindrical threaded portion capable of being tightened by a nut and lock washer which threaded portion extends through the apertured flange of each rigid element and the pierced resilient or cushioning element, such clamp-type connector being capable of clamping two bars or rods or tubes in parallel or angular relation to produce a frame to be covered by material in contact with the frame and the rounded corners of the flanges of the connector elements.

1 Claim, 8 Drawing Figures

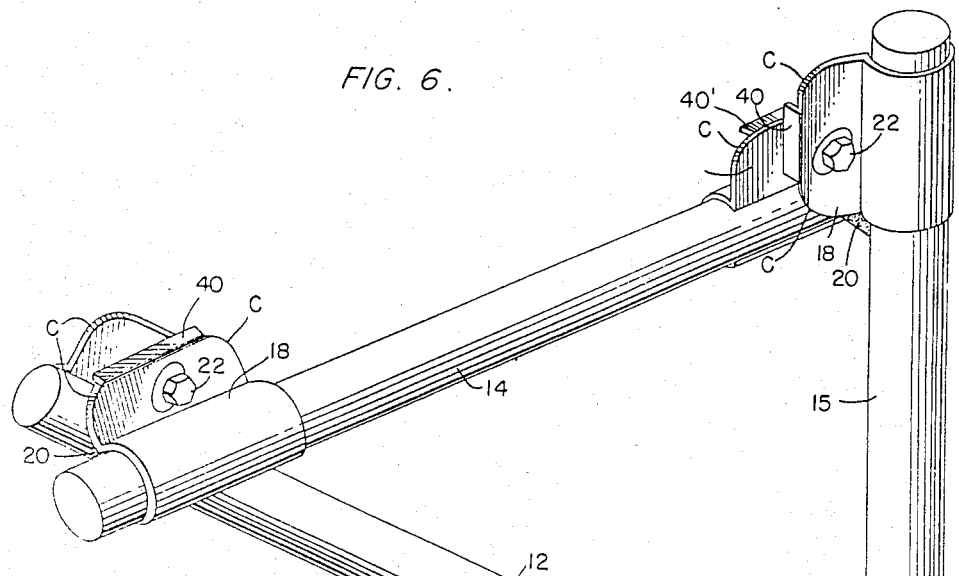
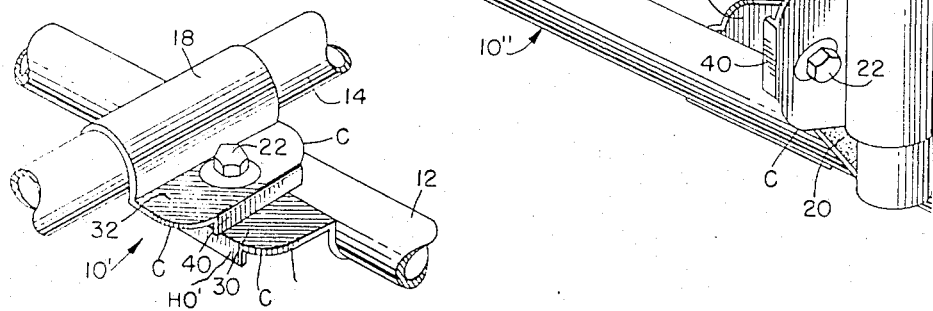

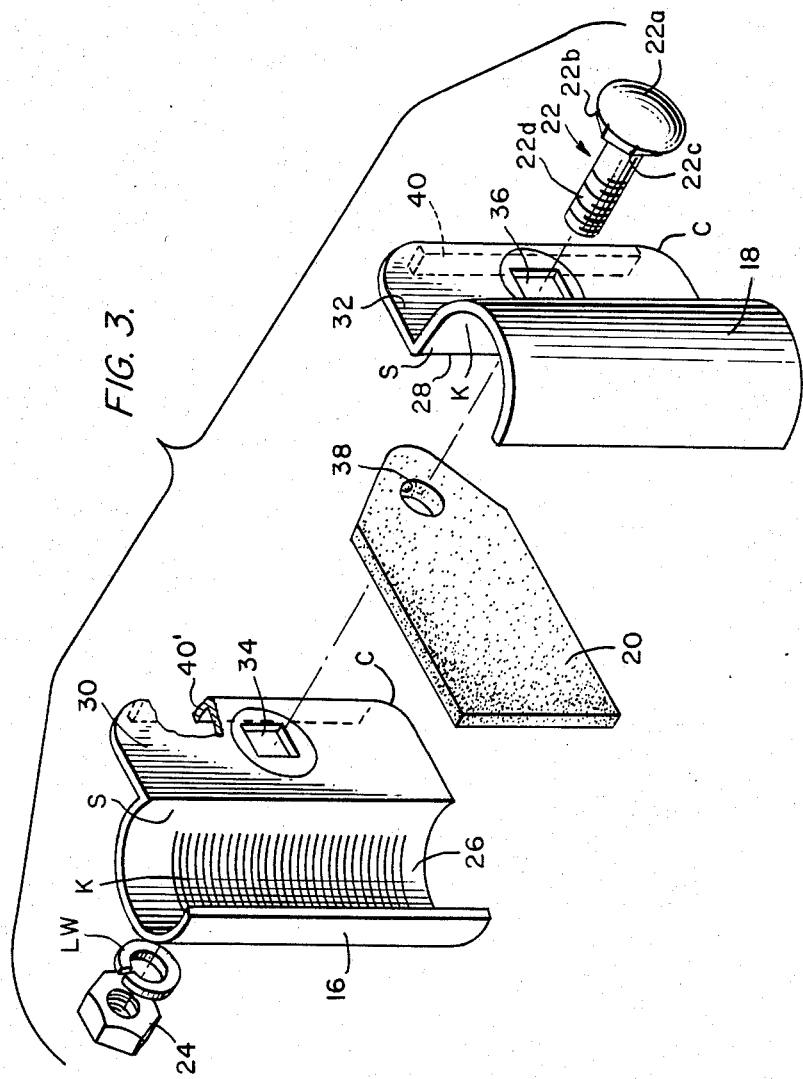

BAR OR ROD OR TUBE FRAME MULTI-POSITION ASSEMBLY CLAMP

FIELD OF INVENTION

The present invention relates generally to bar or rod or tube structure which may be quickly assembled for temporary use and thereafter readily disassembled, and in particular to an improved multi-position clamp secured by a carriage bolt assembly for use with such structures adapted to be fabric covered.

DESCRIPTION OF THE PRIOR ART

Bar or rod or tube frame assemblies are known in the prior art. See, for example, U.S. Pat. No. 2,001,215 (Ruppel—1935), No. 3,354,892 (Freider—1967), No. 3,424,178 (Yazarki—1969), and No. 4,311,407 (Doyle—1982). Generally, such an assembly may comprise a plurality of bar or rod segments whose ends are disposed in and secured together by socket members. In bar or rod assemblies used to support a boat canopy, some of the bar or rod members are telescoped within others and have registered openings in which lock pins or bolts are inserted. In one known assembly, some of the bar or rod segments have threaded ends which are screwed into mating threads in cooperating socket members, while other bar or rod segments have transverse openings adjacent the ends thereof which receive a lock pin or bolt when the ends are inserted into a socket provided with transverse apertures disposed in registration with the transverse openings of the bar or rod segments. In my own prior U.S. Pat. No. 4,311,407 an ordinary bolt and nut assembly is utilized to secure two clamping members each formed with round holes in that both members may be rotated.

SUMMARY OF THE INVENTION

It is an object of the present invention to provide an improved bar or rod frame assembly multi-position clamp in which the relative direction or orientation of one bar or rod member with respect to another may be readily varied by rotating one clamping member about a carriage bolt while a polygonal extension from the head of carriage bolt serves to lock in position a second clamping member formed with a corresponding polygonal opening formed therein.

This object of the invention is achieved in a bar frame assembly multi-position clamp comprising first and second clamping members at least one of which is formed with a polygonal opening and each of which includes a first recessed and grooved or knurled portion surrounded by a smooth marginal area adapted to receive a bar member and a second wide flange portion having a narrow ridge for extension at right angles thereto and a carriage bolt assembly for securing the first and second clamping members together with a third clamping member disposed between the first and second clamping members and the bar members received by the first and second clamping members; said carriage bolt assembly including a carriage bolt having an inside flat surface from which extends a polygonal locking formation and from which, in turn, extends a cylindrical threading portion on which is mounted a lock washer and an internally threaded nut. The polygonal extension on the carriage bolt prevents one clamping member formed with a corresponding polygonal opening from turning while the other clamping member may be rotated to accomplish the building of the desired structure in angular form desired.

These and other novel features of the present invention are described in greater detail in the following description.

BRIEF DESCRIPTION OF THE DRAWINGS

In the drawings, a bar frame assembly clamp and several bar or rod frame member assemblies constructed according to the present invention are illustrated, of which:

FIG. 2 is a cross-sectional view of the assembly clamp taken along section 2—2 of FIG. 1;

FIG. 3 is an exploded perspective view of the assembly clamp illustrated in FIG. 1 with the bar or rod members omitted;

FIG. 4 is a perspective view of a pair of bar or rod members clamped together in crossing relationship by the assembly clamp of the invention.

FIG. 6 is a perspective view of a plurality of bar or rod members secured together in triangular relationship by the assembly clamp of the invention;

DETAILED DESCRIPTION OF THE INVENTION

Figure 1:
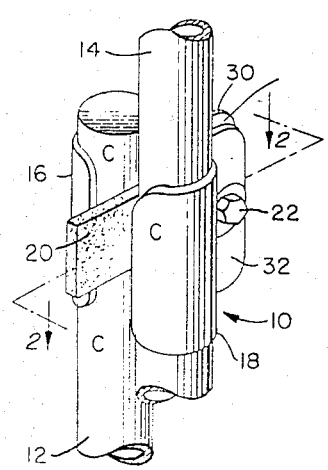
FIG. 1 is a perspective view of an improved bar or rod or tube frame assembly clamp constructed according to the present invention showing a pair of bar or rod members clamped together and extending in generally the same direction and in closely adjacent planes.

Referring now to the drawings, particularly FIGS. 1 and 2, there is shown an assembly 10 comprising two bar or rod members or segments 12 and 14, which may comprise tubular members, extending adjacent to each other. In the assembly 10, segments 12 and 14 are disposed generally parallel to each other and extend in generally the same direction as clamping members or elements 16 and 18 which are provided with rounded corners C and which retain segments 12 and 14, respectively, in secured and fixed relationship with respect to each other. An elongated third clamping member 20 is disposed between segments 12 and 14 to provide a stable assembly and may comprise a pad to prevent damage to the segments and dampen or eliminate vibration. Such a pad is preferably fabricated of rubber or other elastomeric material, and it may also comprise synthetic plastic material. Securing means in the form of a carriage bolt assembly is provided to draw or press clamping elements 16 and 18 toward each other and said assembly preferably comprises a carriage having a head 22a with an inner flat face 22b from which extends a polygonal locking formation 22c from which extends a cylindrical threaded portion 22d on which is mounted the lock washer LW and the internally threaded nut 24. Segments 12 and 14 each have at least a portion thereof extending adjacent to that of the other, and clamping elements 16 and 18 are provided with bar or rod recessed embracing portions 26 and 28 having defined inner surfaces K grooved or knurled and disposed along laterally outward surfaces of the segments. Recessed embracing portions 26 and 28 are generally of semicylindrical shape although they may conform to whatever cross-sectional shape may be given to segments 12 and 14. The inner surfaces K are surrounded by smooth marginal surfaces S thereby limiting the surfaces K so that they do not extend to the outer margins of said recessed embracing portions 26 and 28.

Clamping elements 16 and 18 are arranged with embracing portions 26 and 28 in cradling relationship with segments 12 and 14. The embracing portions 26 and 28 grooved or knurled at K are concave-shaped or recessed to cradle, i.e., receive a bar or rod member therein. Each clamping element is provided with a transversely extending securing portion, illustrated as planar plates or flanges 30 and 32, respectively, which have rounded corners C. To facilitate securing the clamping elements together, plates or flanges 30 and 32 are provided with polygonal apertures 34 and 36, respectively, through which a portion of the securing means in the form of threaded carriage bolt 22 is inserted. Carriage bolt 22 includes a head 22a having a flat inner surface 22b from which extends a polygonal locking formation 22c and from which axially extends a threaded cylindrical portion 22d. The said polygonal locking formation 22c fits within a first aperture 36 and serves to lock or prevent rotation of the carriage bolt with respect to clamping element 18. The threaded cylindrical portion 22d extends through aperture 38 in member 20 and then through aperture 34 in clamping member 16 and receives thereabout the lock washer LW followed by the internally threaded nut 24.

Clamping element 18 may, in some forms, differ in construction from clamping element 16 in that the former includes an abutment flange 32 having rounded corner C, whereas clamping element 16 which also has rounded corners C includes such an abutment flange 30 extending in the opposite direction from its segment or bar contacting surface. As illustrated in FIG. 3, both clamping members 16 and 18 are formed with narrow rigidifying flanges 40' which extend rearwardly and away from each other and in a direction opposite to flanges 40.

As illustrated in FIG. 2, plates or flanges 30 and 32 are disposed at an acute angle with respect to each other and the angle is limited by the height of abutment flange 40. It should be noted, however, that both clamping elements may be provided with abutment flanges 40' as in FIG. 3. It also should be noted that although in the assembly 10 illustrated in FIGS. 1–3, bar or rod segments 12 and 14 are disposed generally parallel to each other, the segments could also be disposed at an angle to each other, crossing each other at right angles as in the assembly 10' illustrated in FIGS. 4 and 5, or at any other angle. Assembly 10' may be readily formed piece by piece or by rearranging assembly 10 by loosening nut 24 on bolt 22, thus putting the clamp and assembly in a loosened condition which permits relative movement of one of the clamping elements and its corresponding bar member with respect to the other clamping element, and rotating one of the segments 12 together with its clamping element 16, for example, about the axis of bolt 22, and thereafter tightening nut 24, thus putting the securing means in a tightened condition in which the clamping elements and bar members are secured in fixed relationship with respect to each other, and securing the assembly. In carrying out this procedure, the locking formation 22c serves to hold in fixed position the clamping member engaging the inner face 22b of the head 22a of the carriage bolt 22, while the other clamping member is adjusted to the desired angle or position.

Figure 5:
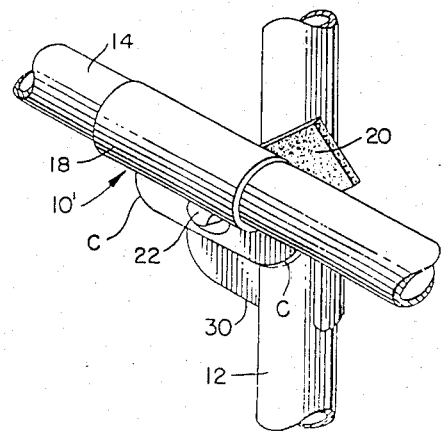
FIG. 5 is another perspective view of the bar or rod members and assembly clamp illustrated in FIG. 4.

The bar or rod segments may be clamped together so as to extend from 0° to 360° with respect to each other as desired. In assembly 10', third clamping member 20 is disposed between bar or rod members 12 and 14 as illustrated in FIG. 5. FIG. 6 illustrates another assembly 10" in which bar or rod members 12 and 14, assembled together by clamping elements 16 and 18, are each additionally clamped and assembled by the clamping elements to bar or rod member 15 to form a triangle.

It is to be understood that in accordance with the instant invention the clamp is capable of readily controlled multiple positions so that the rods or bars or tubes may be connected at various angles with each other. This readily controllable and adjustable operation is facilitated by the cooperation of the polygonal locking formation 22c with the corresponding polygonal aperture in the clamping member as, for example, aperture 36 in FIG. 3. Accordingly, it will be understood that the fabric canopy or cover, not shown, will be in contact with corners of plates or flanges 30 and 32 and abutment flange 40 which take different positions in different parts of the assembly which are disposed at different angles. It is because of rounded corners C that cutting or tearing of the fabric or wearing at places of contact is prevented.

It is also to be understood that when vibration takes place, the members of the assembly are subject to stress tending to cause a tendency for the rods or bars or tubes to slide in the embracing portions 26 and 29 of the clamping elements. This tendency to slide is prevented by the grooved or knurled inner surfaces K which are surrounded by the smooth surfaces S. The locking formation 22c and the lock washer LW serve to securely hold the members in desired position after they are adjusted and the nut 24 is tightened.

Figure 8:
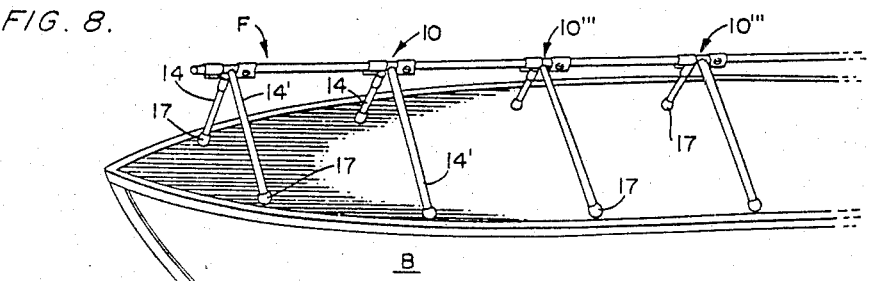
FIG. 8 is a perspective view of a plurality of bar or rod frame assemblies of the type illustrated in FIG. 7 arranged in a series of like pairs of legs depending from a ridge pole supported above the deck of a boat.
Figure 7:
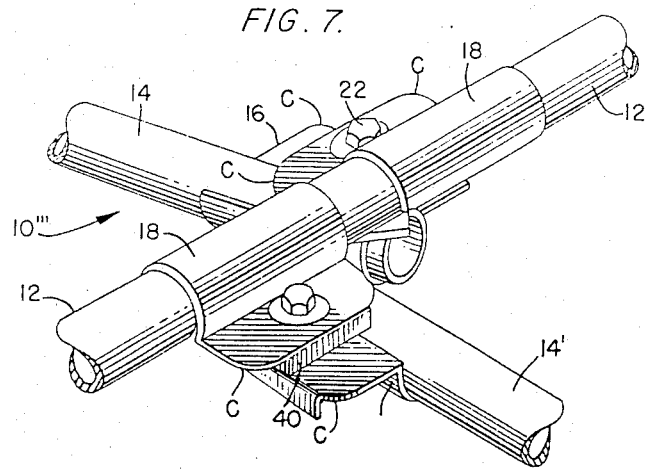
FIG. 7 is a top perspective view of a pair of bar or rod members secured together by the assembly clamp of the invention to a ridge pole which depend from the ridge pole as legs thereof.

In FIGS. 7 and 8, an alternative assembly 10''' is shown in which a framework F is provided over which a covering (not illustrated) for a boat B may be secured. In assembly 10''' bar or rod members 12 and 14 are secured to each other by clamping elements 16 and 18 and member 14 extends downwardly as a supporting leg from one side of member 12, which forms a ridge pole. A second rod member 14' extends downwardly from the other side of ridge pole 12 as a second supporting leg and forms an inverted "V" with member 14. Each of legs 14 and 14' may be provided with end caps 17 of plastic or elastomeric material to protect the deck of the boat and/or to minimize sliding of the framework F formed thereby. The framework may comprise any number of pairs of the bar or rod members 14 and 14'.

In the foregoing specification, the invention has been described with reference to specific exemplary embodiments thereof. It will, however, be evident that various modifications and changes may be made thereunto without departing from the broader spirit and scope of the invention as set forth in the appended claim. The specification and drawings are, accordingly, to be regarded in an illustrative rather than in a restrictive sense.

I claim:

1. A multi-positional clamp for securing rods, bars, or tubes of various lengths in fixed positions and at various angles to produce a frame assembly adapted to be covered with a woven fabric or non-woven sheet, which frame assembly may be subject to motion or vibration, and wherein said clamp includes two rigid clamping members adapted to be secured by a carriage bolt assembly and at least one resilient flexible, deformable and cushioning member, said clamp being characterized in that (a) each of said rigid clamping members comprising
  (i) a flat slidable surfaced wide flange portion, each flange portion having on a different one side extending, at right angles, a long, narrow integral flange acting to stiffen each wide flat flange, and having on the same side
  (ii) a cradle embracing portion having a relatively large centrally positioned grooved or knurled inner surface surrounded by a relatively narrow smooth marginal surface,
(b) each said flat flange portion having a dished portion formed with a polygonal opening therein for cooperation with a corresponding polygonal shank, integral with and adjacent to the inner face of the head of a carriage bolt of said carriage bolt assembly, including a threaded generally cylindrical portion extending from said polygonal shank so that one of said flat flange portions can be rotated individually about the cylindrical portion of said carriage bolt and so that the second of said flat portions remains relatively stationary because of the engagement of the polygonal shank portion of said bolt with the margin of the polygonal opening therein,
(c) said carriage bolt assembly comprising a carriage bolt having
  (i) a head with a flat inner surface from which coaxially extends
  (ii) an integral shank having a transverse polygonal cross section from which coaxially extends a threaded cylindrical portion, and a lock washer about or surrounding said threaded portion and an internally threaded nut cooperating with said threaded portion
(d) said bolt assembly and said two clamping members and their respective parts being arranged in series as follows:
  (i) first, the inner face of the bolt head contacts the convex or outwardly protruding surface of the dished portion of a flat flange of a first clamping member
  (ii) second, the polygonal shank of the bolt extends through the corresponding polygonal opening in said dished portion of said first clamping member
  (iii) third, the cylindrical threaded portion of said bolt extends through said deformable and cushioning member and then through the opening in the dished portion of the second clamping member
  (iv) fourth, the cylindrical threaded portion extends through a lock washer which on one surface contacts the convex or outwardly protruding surface of the dished portion of the second clamping member and which on its opposite surface contacts the cooperating nut of the bolt assembly which nut is threaded on the corresponding threaded cylindrical portion of said bolt.

* * * * *